(12) United States Patent
Davydov et al.

(10) Patent No.: US 9,723,508 B2
(45) Date of Patent: Aug. 1, 2017

(54) WIRELESS INTERFERENCE MITIGATION

(71) Applicant: Intel Corporation, Santa Clara, CA (US)

(72) Inventors: Alexei Davydov, Nizhny Novgorod (RU); Seunghee Han, Cupertino, CA (US); Yi Hsuan, Sunnyvale, CA (US); Jong-Kae Fwu, Sunnyvale, CA (US); Gregory Morozov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 88 days.

(21) Appl. No.: 14/646,524

(22) PCT Filed: Dec. 3, 2013

(86) PCT No.: PCT/US2013/072887
§ 371 (c)(1),
(2) Date: May 21, 2015

(87) PCT Pub. No.: WO2014/089091
PCT Pub. Date: Jun. 12, 2014

(65) Prior Publication Data
US 2015/0289280 A1    Oct. 8, 2015

Related U.S. Application Data

(60) Provisional application No. 61/732,851, filed on Dec. 3, 2012.

(51) Int. Cl.
*H04W 72/08*     (2009.01)
*H04W 24/10*     (2009.01)
(Continued)

(52) U.S. Cl.
CPC .......... *H04W 24/10* (2013.01); *H04B 1/3827* (2013.01); *H04B 7/0452* (2013.01);
(Continued)

(58) Field of Classification Search
CPC ............................. H04W 84/18; H04W 84/12
See application file for complete search history.

(56) References Cited

U.S. PATENT DOCUMENTS

2008/0008261 A1\* 1/2008 Baggen ................ H04L 25/022
375/296
2008/0063120 A1\* 3/2008 Aoki ................... H04L 27/2613
375/344

(Continued)

OTHER PUBLICATIONS

3GPP TS 36.211 V11.0.0 (Sep. 2012); "Technical Specification Group Radio Access Network; Evolved Universal Terrestrial Radio Access (E-UTRA); Physical Channels and Modulation (Release 11)," 106 pages.

(Continued)

*Primary Examiner* — Andrew Lai
*Assistant Examiner* — Zhiren Qin
(74) *Attorney, Agent, or Firm* — Schwabe, Williamson & Wyatt, P.C.

(57) ABSTRACT

A User Equipment and an eNodeB system are configured for performing interference mitigation in the UE. Input circuitry in the wireless communication device receives an OFDM downlink channel signal associated with a serving cell and receives downlink control information for an interfering cell. The downlink control information is used by the UE to perform channel estimation for the interfering cell. An interference mitigation module is provided for calculating an interference-mitigated version of the received channel signal using estimated channel transfer functions for both the serving cell and the interfering cell, power control parameters and using set of modulation constellation points cor- (Continued)

responding to the OFDM downlink channel. Other embodiments may be described and claimed.

22 Claims, 11 Drawing Sheets

(51) Int. Cl.
| | |
|---|---|
| H04W 72/12 | (2009.01) |
| H04B 1/3827 | (2015.01) |
| H04W 84/18 | (2009.01) |
| H04W 92/18 | (2009.01) |
| H04W 72/04 | (2009.01) |
| H04L 25/03 | (2006.01) |
| H04L 5/00 | (2006.01) |
| H04W 36/10 | (2009.01) |
| H04W 52/40 | (2009.01) |
| H04W 76/04 | (2009.01) |
| H04J 11/00 | (2006.01) |
| H04W 76/02 | (2009.01) |
| H04W 52/02 | (2009.01) |
| H04L 1/00 | (2006.01) |
| H04W 24/02 | (2009.01) |
| H04L 25/02 | (2006.01) |
| H04B 7/0452 | (2017.01) |
| H04B 7/06 | (2006.01) |
| H04B 7/155 | (2006.01) |
| H04L 1/18 | (2006.01) |
| H04W 84/04 | (2009.01) |
| H04L 27/00 | (2006.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/03305* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(56) References Cited

U.S. PATENT DOCUMENTS

| | | | |
|---|---|---|---|
| 2009/0052566 A1* | 2/2009 | Maltsev | H04L 27/2647 375/260 |
| 2010/0150079 A1* | 6/2010 | Maltsev | H04L 1/06 370/329 |
| 2011/0268007 A1 | 11/2011 | Barany et al. | |
| 2012/0008582 A1 | 1/2012 | Gerlach | |
| 2012/0087250 A1 | 4/2012 | Song et al. | |

OTHER PUBLICATIONS

3GPP TS 36.212 V11.0.0 (Sep. 2012); "Technical Specification Group Radio Access Network; Evolved Universal Terrestrial Radio Access (E-UTRA); Multiplexing and channel coding (Release 11)," 79 pages.
3GPP TS 36.213 V11.0.0 (Sep. 2012); "Technical Specification Group Radio Access Network; Evolved Universal Terrestrial Radio Access (E-UTRA); Physical layer procedures (Release 11)," 143 pages.
3GPP TS 36.331 V11.1.0 (Sep. 2012); "Technical Specification Group Radio Access Network; Evolved Universal Terrestrial Radio Access (E-UTRA); Radio Resource Control (RRC); Protocol specification (Release 11)," 325 pages.
International Search Report and Written Opinion mailed Mar. 24, 2014 from International Application No. PCT/US2013/072887.
Alcatel, SINR Measurements for Scheduling with Interference Coordination, R1-063392, 3GPP TSG RAN WG1 #47 Meeting, Riga, Latvia, Nov. 6-10, 2006.
Intel Corporation, "Remaining Issues of Interference Measurements", R1-122627, 3GPP TSG-RAN WG1 #69, Prague, Czech, May 21-25, 2012.

* cited by examiner

WIRELESS INTERFERENCE MITIGATION

CROSS REFERENCE TO RELATED APPLICATIONS

The present application is a national phase entry under 35 U.S.C. §371 of International Application No. PCT/US2013/072887, filed Dec. 3, 2013, entitled "WIRELESS INTERFERENCE MITIGATION", which designates the United States of America, which claims priority to U.S. Patent Application No. 61/732,851, filed Dec. 3, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

TECHNICAL FIELD

Embodiments described herein generally relate to the field of communications, and more particularly, to interference cancellation in wireless communication networks.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) and LTE-Advanced (LTE-A), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi. It should be noted that LTE and LTE-A are the same technology, but LTE-A is used to distinguish releases 10 and 11 (current version) of the standard from earlier releases.

In 3GPP radio access network (RAN) LTE and LTE-A systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNodeB) to the wireless device (or UE), and the uplink (UL) transmission can be a communication from the wireless device to the node.

In LTE and LTE-A, data can be transmitted from the eNode B to the UE via a physical downlink shared channel (PDSCH). A physical downlink control channel (PDCCH) and/or enhanced physical downlink control channel (EPDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNode B to the UE. The EPDCCH is transmitted on the same OFDM symbols of the subframe as PDSCH as illustrated by FIGS. 3A and 3B described below. If resource allocation information for PDSCH conveyed by PDCCH or EPDCCH is not received correctly, the decoding of the corresponding PDSCH is likely to fail. Since failed decoding of PDSCH will be detrimental to system performance, the reliability of accurate receipt of PDCCH and EPDCCH is an important system requirement. It is known to improve reliability of these downlink control channels using transmission techniques such as channel coding, spatial diversity and frequency diversity.

Interference may occur when a User Equipment (UE) such as a mobile terminal communicates with a serving base station in a wireless network environment. For example, a neighboring base station may be communicating with other UEs concurrently with the serving base station communicating with a given UE and these communications from the neighboring base station can cause interference issues for the given UE communicating with the serving base station.

As advances in wireless communication technology progress, it is desirable to improve the capacity of LTE-A networks by deployment of heterogeneous networks to achieve cell-splitting gains and Multi-User Multiple-Input Multiple-Output (MU-MIMO). It is expected that co-channel interference originating from either inter-cell (between different cells) or co-scheduled intra-cell (same cell) users will be an important limiting factor in achieving higher network capacity.

It is known to implement interference mitigation at the network side, for example, at the transmitting base station, by employing coordinated multi-point techniques (CoMP). These CoMP techniques involve base transceiver stations being grouped together such that base transceiver stations from multiple cells can transmit signals to the UE and receive signals from the UE.

It is known in communication systems such as LTE, which employs Single User MIMO to use maximum likelihood demodulation to jointly decode two communication signals corresponding to two data streams transmitted substantially simultaneously by the same base station to the same UE. This mitigates intra-cell interference. In this case the UE has information on the modulation scheme used for both of the received data streams.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses for performing interference mitigation at a UE in a wireless communication network.

Figure 1A:
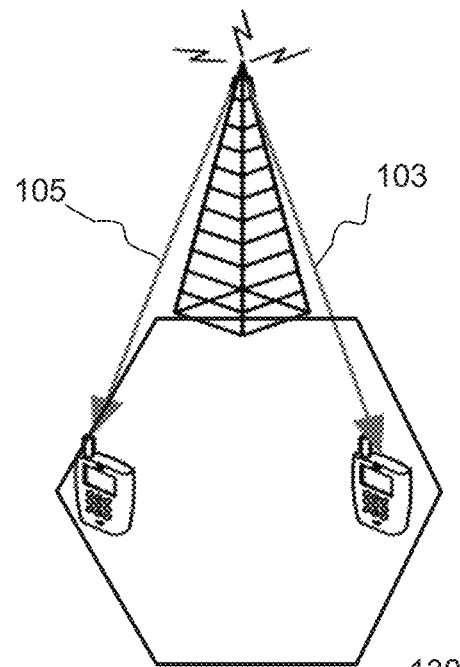
FIG. 1A schematically illustrates intra-cell interference and FIG. 1B schematically illustrates inter-cell interference.

FIG. 1A schematically illustrates intra-cell interference where two UEs currently served by the same eNodeB in the same serving cell experience interference from concurrently scheduled communication links 103, 105.

Figure 1B:
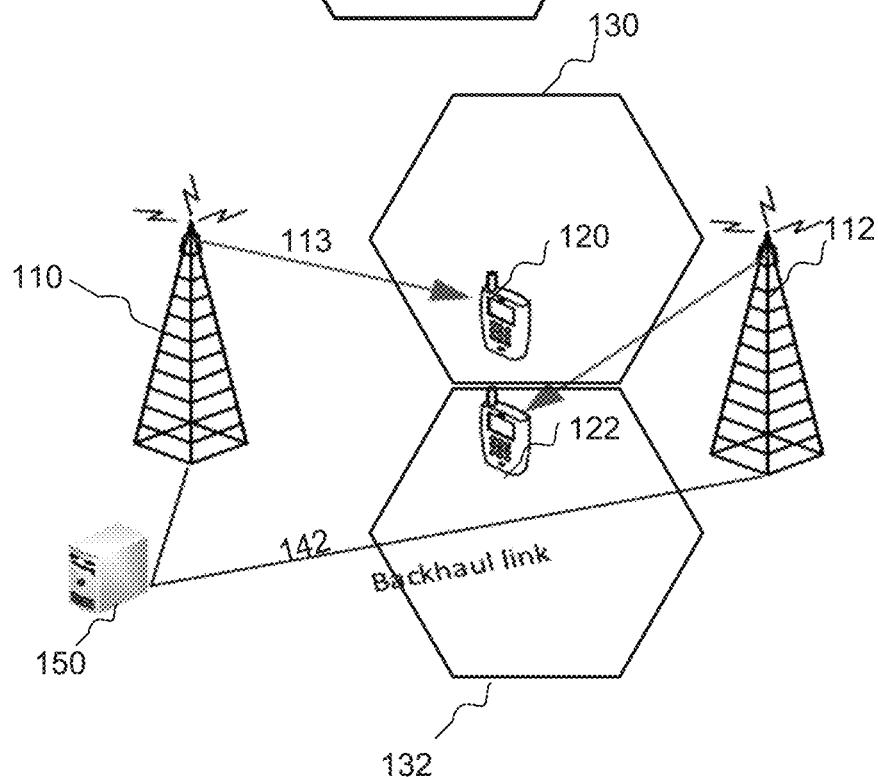

FIG. 1B schematically illustrates inter-cell interference where a first eNodeB 110 is configured to communicate wirelessly with a first UE 120 located within its serving cell 130 and a second eNodeB 112 is configured to perform wireless communication with a second, different UE 122 located within the serving cell 132 of the second eNodeB. With regard to the communication signal 113 between the first eNodeB 110 and the first UE 120, the signal 115 is an interfering signal and the cell 132 can be denoted the "interfering cell" for that communication. A first wireless communication between the first eNodeB 110 and the first UE 120 and a second, substantially concurrent, wireless communication between the second eNodeB 112 and the second UE 122 can give rise to inter-cell interference. The first and second eNodeBs 110, 112 can be configured to communicate control information to each other via a backhaul link 142, which connects them directly or via a network controlling entity. In FIG. 1B, the eNodeBs 110, 112 are connected via a network controlling entity 150, but in other embodiments, two eNodeBs are connected directly (without intermediary) via a backhaul link.

Figure 2:
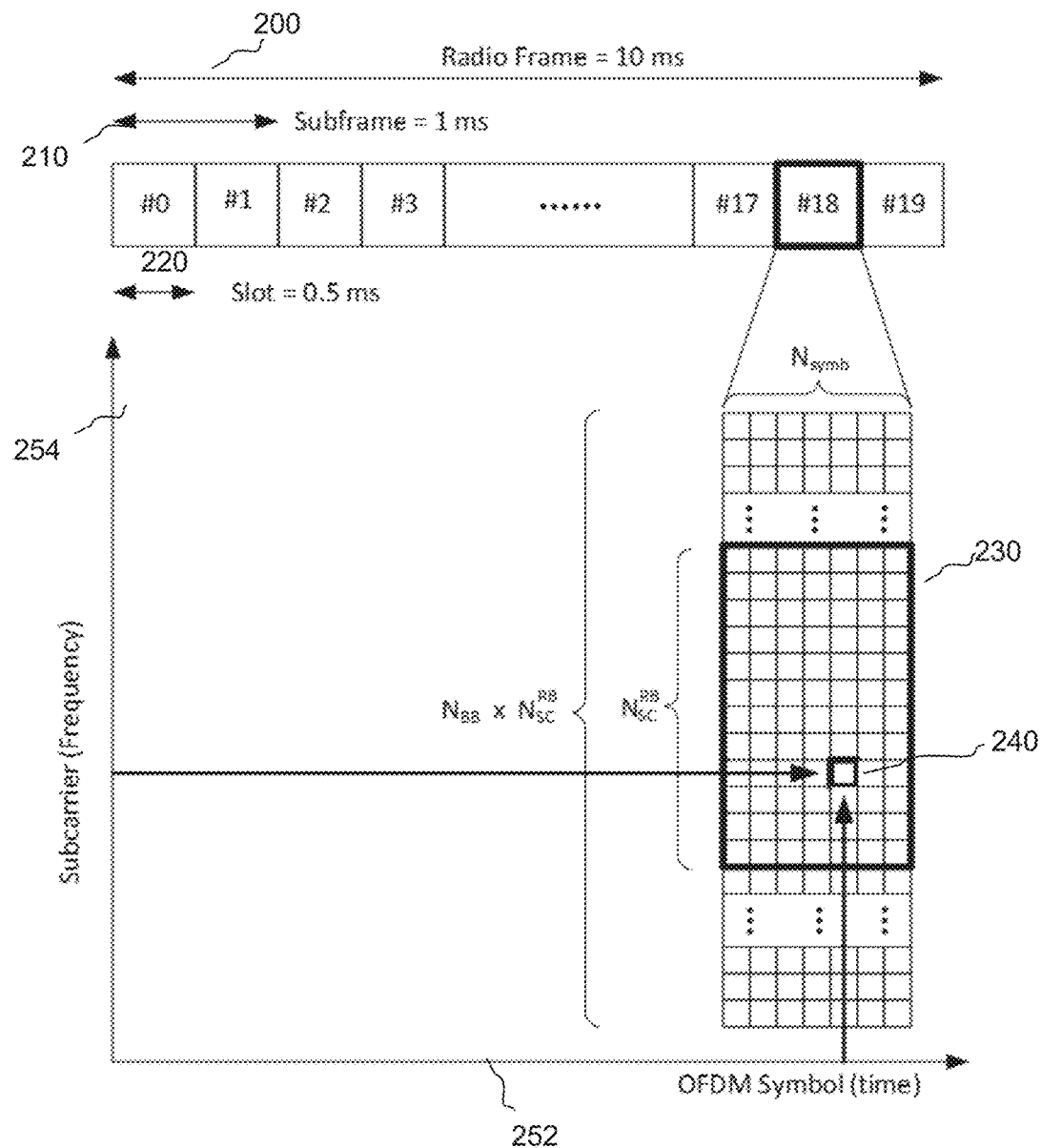
FIG. 2 schematically illustrates a downlink radio frame structure.

FIG. 2 schematically illustrates a block diagram of radio frame resources corresponding to a downlink LTE radio frame structure according to some embodiments. A radio frame 200 has a duration of 10 milliseconds and is composed of twenty contiguous 0.5 millisecond slots. A subframe 210 is formed from two adjacent slots and thus has a one millisecond duration. FIG. 2 shows slot #18, which is the penultimate slot of the frame, in more detail. A single resource block 230 can be seen to comprise a number of OFDM symbols $N_{symbol}=7$ on a time axis 252 and a plurality of subcarriers $N_{SC}^{RB}=12$ on a frequency axis 254. Each OFDM symbol has occupies a timeslot within the slot 220. The resource block 230 comprises a total of $N_{symbol} \times N_{SC}^{RB}$ constituent resource elements.

A single resource element 240 is characterized by a single subcarrier frequency and a single OFDM symbol. In FIG. 2, although only one complete resource block 230 is shown, a plurality of resource blocks $N_{BB}$ are associated with each of the twenty slots of the radio frame 200. The resource block 230 in the FIG. 2 example is mapped to eighty-four resource elements 240 using short or normal cyclic prefixing. In one alternative arrangement (not shown) the resource block is mapped to seventy-two resource elements using extended cyclic prefixing.

Each resource element 240 can transmit a number of bits depending upon the particular type of modulation scheme employed for the channel with which the resource element is associated. For example, where the modulation scheme is quadrature phase-shift keying (QPSK), each resource element 240 can transmit two bits. For a 16 quadrature amplitude modulation (QAM) or 64 QAM more bits can be transmitted per resource element. However, for binary phase shift keying (BPSK), a single bit is transmitted in each resource element. The resource block 230 can be configured either for downlink transmission from the eNodeB to the UE or for uplink transmission from the UE to the eNodeB.

Figure 3A:
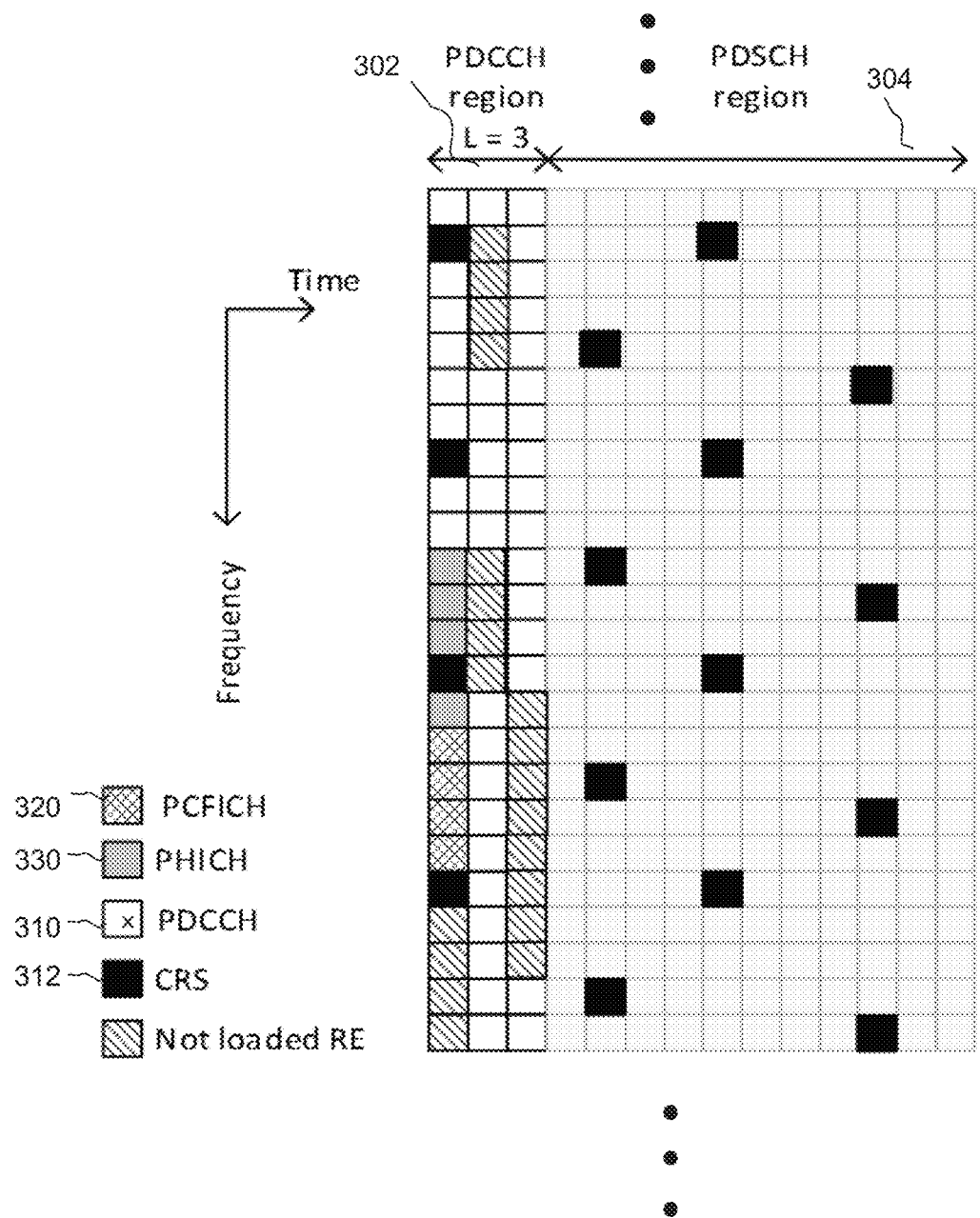
FIG. 3A schematically illustrates a downlink LTE subframe illustrating the structure of the PDCCH.

FIG. 3A schematically illustrates a downlink LTE subframe illustrating the structure of the PDCCH. The Figure shows only two illustrative resource blocks out of a total of $N_{BB}$ resource blocks of the subframe. The downlink subframe 300 comprises fourteen OFDM symbols along the time axis and $N_{BB} \times N_{SC}^{RB}$ sub-carriers along the frequency axis. Thus the subframe comprises a plurality of resource blocks and $N_{symbol}=14$ times $N_{SC}=N_{BB} \times N_{SC}^{RB}$ resource elements. The data carried on the PDCCH can be referred to as downlink control information. Multiple wireless devices can be scheduled in one subframe of a radio frame, so multiple downlink control information messages can be sent using multiple PDCCHs. The PDCCH can be designed to demodulate based on cell-specific reference signals (CRS) common to an entire cell.

As shown in FIG. 3A, the PDCCH region in LTE comprises a set of OFDM L symbols (L=1, 2, 3) in the beginning of each downlink subframe. The downlink subframe comprises a PDCCH region 302 spanning the first three OFDM symbols in this example arrangement. In other embodiments, PDCCH transmission uses a different pattern of OFDM symbols. A PDSCH region 304, in which the downlink data is transmitted spans the remaining eleven OFDM symbols of the subframe. In the PDCCH region 302, as well as the PDCCH 310, the CRS 312 is also transmitted. The CRS can also be transmitted in the downlink data (PDSCH) region 304. Other control information transmitted in the PDCCH region 302 of the subframe comprises the Physical Control Format Indicator Channel (PCFICH) 320 and Physical Hybrid-ARQ Indicator Channel (PHICH) 330. The PCFICH 320 informs the UE about the size of the control region (one, two or three OFDM symbols). There is only one PCFICH on each component carrier, i.e., in each cell. The PHICH 330 is used to signal hybrid-ARQ acknowledgements in response to uplink shared channel transmissions. Multiple PHICHs 330 can exist in each cell. In some example embodiments PDCCH, PCFICH and CRS channels all use QPSK modulation (2 bits per resource element) whereas the PHICH uses BPSK modulation (one bit per resource element).

In case of BPSK modulation, a single bit, b(i), is mapped to a complex-valued modulation symbol x=I+jQ according to Table 1.

TABLE 1

| BPSK modulation mapping. | | |
|---|---|---|
| b(i) | I | Q |
| 0 | $1/\sqrt{2}$ | $1/\sqrt{2}$ |
| 1 | $-1/\sqrt{2}$ | $-1/\sqrt{2}$ |

In case of QPSK modulation, pairs of bits, b(i),b(i+1), are mapped to complex-valued modulation symbols x=I+jQ according to Table 2.

TABLE 2

QPSK modulation mapping.

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

The PDCCH may not be adequate to convey information needed to allow a wireless device to take advantage of multiple transmission nodes in a heterogeneous network, which includes a number of different kinds of nodes in a single macro cell servicing area. Heterogeneous networks should allow more wireless devices to be served simultaneously. To overcome certain limitations in PDCCH, the enhanced PDCCH (EPDCCH) can be used. The EPDCCH is configurable to use resource elements in an entire resource block or resource block pair, the pair being two contiguous resource blocks using the same subcarrier's subframe. This contrasts with the PDCCH, which as shown in FIG. 3A, uses just the first one to three columns of OFDM symbols in a first slot resource block in a subframe. The greater flexibility in use of resource elements within the resource block(s) means that the EPDCCH can be configured with increased capacity to allow advances in the design of cellular networks.

Figure 3B:
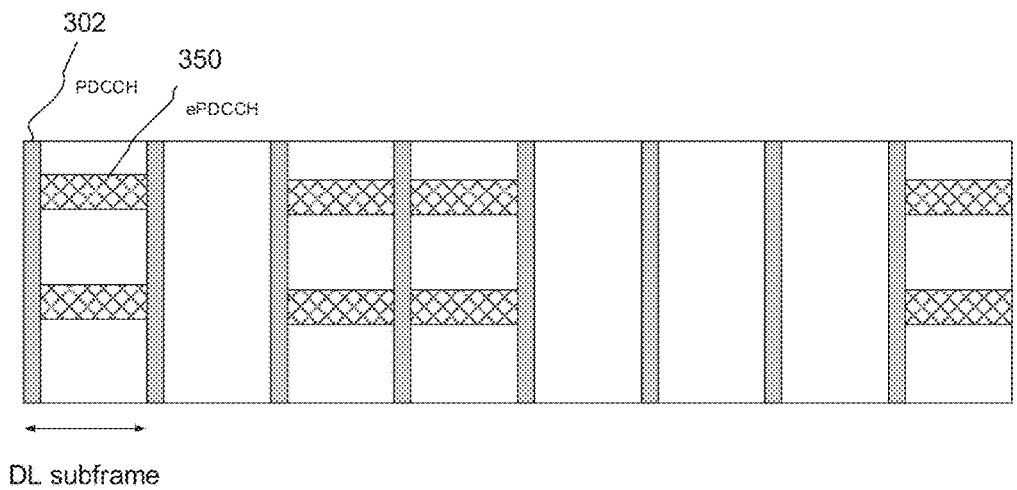
FIG. 3B schematically illustrates radio frames showing the relative locations of PDCCH and EPDCCH.

FIG. 3B schematically illustrates radio frames showing the relative locations of PDCCH 302 and EPDCCH 350. The enhanced PDCCH was introduced in LTE Release 11 as part of a new control channel structure. As shown in FIG. 3B, EPDCCH is transmitted within resource blocks in a similar way to PDCCH, but whilst PDCCH is transmitted in the control region and spans the full system bandwidth, the EPDCCH is transmitted in the data region (PDSCH region) of the subframe and typically spans only a small portion of the overall bandwidth. Since this gives control over which part of the overall spectrum an EPDCCH is transmitted in, it provides for frequency-selective scheduling for control channels and allows inter-cell interference coordination in the frequency domain. In the illustrated example, EPDCCH occupies distinct bands of subcarriers in only a subset of the subframes. In contrast to PDCCH, for EPDCCH, the reference signal sequence is typically terminal-specific (or user-specific), i.e., each user terminal is explicitly configured with a parameter that is used to derive the reference-signal sequence and EPDCCH allocation within subframe.

Figure 3C:
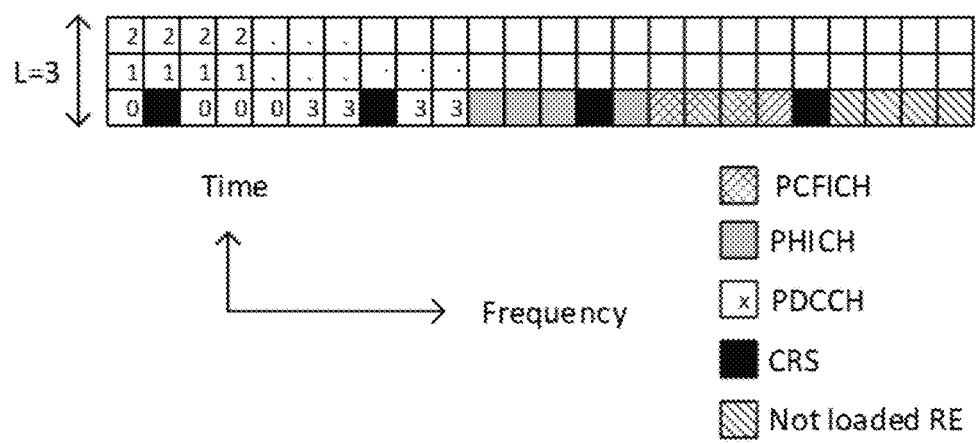
FIG. 3C schematically illustrates an example PDCCH structure.

FIG. 3C schematically illustrates an example PDCCH structure showing an alternative view of the PDCCH region of the downlink LTE subframe of FIG. 3A. LTE includes the concept of an antenna port and each downlink transmission is carried out from a specific antenna port. Downlink multi-antenna transmission is a key feature of LTE. The antenna port is an abstract concept and does not necessarily correspond to a specific physical antenna. The identity of the antenna port is known to the UE and the UE assumes that two received signals have experienced the same radio channel only if they originate from the same antenna port. For the downlink, each antenna signal can be correlated with a specific reference signal (RS), which can be used by the UE to estimate the channel corresponding to the particular antenna port.

According to the present technique, considering for simplicity a single antenna port (e.g. CRS antenna port 0) of the transmitter ($N_{tx}=1$), a signal received by the UE can be represented by the following equation:

$$r = h \cdot s + g \cdot t + n, \quad \text{(eqn. 1)}$$

Where r is the received signal; h is the channel transfer function on a given resource element (or subcarrier) for the serving channel; g is the channel transfer function on a given resource element (or subcarrier) for the interfering channel; s is the serving signal (PDCCH/PCFICH/PHICH) and t is the interfering signal (PDCCH/PCFICH/PHICH) transmitted by serving and interfering cells respectively; and n is additive residual interference and noise. A channel transfer function (such as h or g) is a channel estimation of radio wave propagation conditions and in some embodiments also includes power control as described later. Reference signals can be used to estimate a frequency domain channel transfer function in a time dispersive environment. In particular known frequency domain reference signals subcarriers can be embedded in the OFDM symbol's spectrum. Transmission of s and t is by the base stations, eNodeBs, nodes etc. depending upon system configuration. If the number of receiving antenna at the UE is represented by $N_{rx}$ the parameters h and g are vectors of dimension ($N_{rx}$ by 1). A value of $N_{rx}=2$ is commonly used. In the case of a single CRS antenna, s and t in equation (1) are scalars whilst h, g and r are vectors of dimension two by one.

In accordance with some embodiments, to take account of interference from a neighboring interfering cell, the UE performs scanning over all possible interfering signal candidates $t_i$ within a set T. For each interfering signal candidate $t_i$, the UE estimates the "optimal" useful signal candidate $\hat{s}(t_i)$, representing a best current estimate as follows $$\hat{s}(t_i) = \text{slice}\{(h^h h)^{-1} h^h (r - g \cdot t_i)\}, \quad \text{(eqn. 2)}$$

where slice{•} finds nearest signal point in the constellation used by the useful signal (modulation scheme dependent) and where the superscript "h" represents a Hermitian transpose operation, which involves a matrix transpose and complex conjugation and the superscript "−1" represents a matrix inverse. Useful signal candidate estimation of an OFDM signal as specified by equation 2 can improve information transmission because it helps to take account of the fact that the signal received at the UE is likely to differ from the transmitted signal due to noise and interference on the communication channel. Note that in the term "optimal useful signal candidate", the word optimal can be interpreted as a best estimate according to the described technique.

Figure 4:
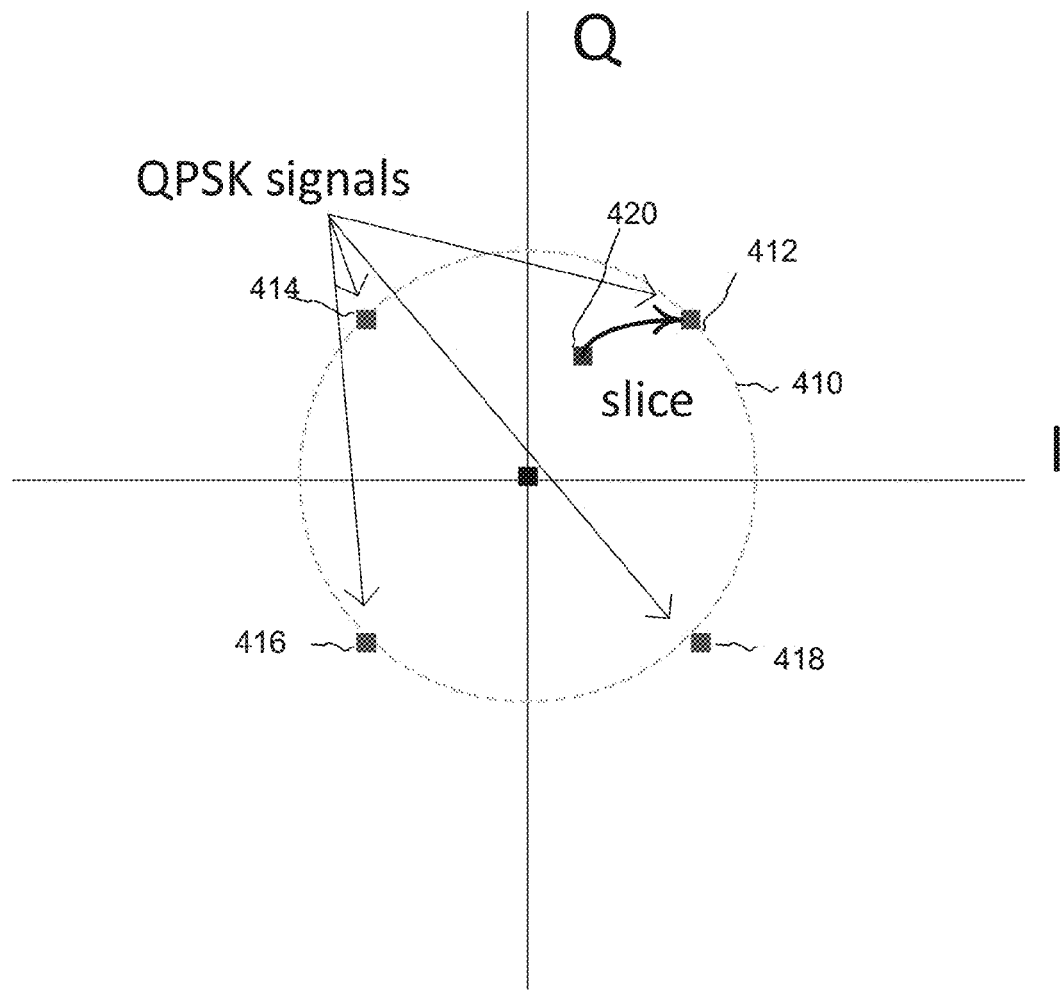
FIG. 4 schematically illustrates estimating an optimal useful signal candidate for PDCCH with QPSK modulation.

FIG. 4 schematically illustrates the "slice" calculation of equation 2 above for the case of s and t corresponding to the PDCCH, which uses QPSK modulation. In FIG. 4, the horizontal axis I is the real axis and the vertical axis Q is the imaginary axis. The four signal points 412, 414, 416 and 418 on the radius of the circle 410 correspond to the complex-valued modulation symbols of Table 2 above, whilst a point 420 lying off the radius of the circle 410 corresponds to the signal $(h^h h)^{-1} h^h (r - g \cdot t_i)$. As shown, the slicing of equation 2 effectively maps the signal value 420 to the closest point 412 of the four QPSK modulation signals to obtain the optimal useful signal candidate value. Once the optimal useful signal candidate has been calculated for the particular channel and particular resource element, in some embodiments a maximum likelihood decision is then calculated according to equation 3 below in order to obtain an interference-mitigated useful signal s, is given by:

$$s = \operatorname*{argmin}_{t_i \in T} \|r - g \cdot t_i - h\hat{s}(t_i)\|^2 \quad \text{(eqn. 3)}$$

In equation 3, the symbol $\|\cdot\|^2$ represents a vector norm of the vector $(r - g \cdot t_i - h\hat{s}(t_i))$ and the "arg min" provides the element $t_i$ in set T that achieves a global minimum of real-valued function. As noted above, the elements $t_i$, which represent possible interference signal candidates depend upon the particular modulation scheme used for the channel and in some example embodiments also depend on power control settings. From Tables 1 and 2, for the PDCCH region, the set of possible interfering signal points may be described by QPSK constellation and zero power point (I,Q=0) as shown in Table 3. Table 3 shows the set T of constellation points for maximum likelihood interference mitigation. The zero-power point is used to cover a so-called partial loading case of PDCCH region, i.e., when a subset of the resource elements in the first L OFDM symbols create no interference.

TABLE 3

| I | Q |
|---|---|
| $1/\sqrt{2}$ | $1/\sqrt{2}$ |
| $1/\sqrt{2}$ | $-1/\sqrt{2}$ |
| $-1/\sqrt{2}$ | $1/\sqrt{2}$ |
| $-1/\sqrt{2}$ | $-1/\sqrt{2}$ |
| 0 | 0 |

In case of more than one antenna port (two or four CRS antenna port), in some embodiments the maximum likelihood interference cancellation may be limited to a single antenna port (e.g. CRS antenna port 0). Any signaling to indicate the antenna ports for interfering cells (e.g. antenna ports of CRS) can facilitate the maximum likelihood interference cancellation for one or multiple CRS antenna ports (e.g. antenna port 0, 1, 2, or 3). This signaling of the downlink control information for the interfering signal is received at the UE from a higher layer via the serving node and the interfering node. This interfering cell downlink control information could originate, for example, from the Radio Resource Control (RRC) located in the eNodeB of the interfering cell or from any other network controlling entity.

The maximum likelihood decision of equation 3 above is only one example of how the demodulation according to the present technique can be performed. Assuming that there is a transmitted signals s, t and a received signal r, the received signal r is related to the transmitted signal s, t by a transformation function representing attenuation, Doppler shift, interference, noise etc. Assuming that the transformation function is known, there is a problem of using received signal values r to estimate transmitted signal values s. A maximum likelihood estimation is defined an algorithm that maximizes p(r|s,t), where p(r|s,t) is a conditional probability density function of the observed series r given that the transmitted series has the values s,t. An alternative method of maximum aposteriori estimation (MAP) is one example of an algorithm that could be used instead of maximum likelihood estimation according to the present technique. Equation 3 above is only one implementation of maximum likelihood estimation and represents finding a value of an interfering signal candidate $t_i$ that minimizes the vector norm of the vector quantity $r - g \cdot t_i - h\hat{s}(t_i)$ and thus effectively selects a useful signal value s for a given $t_i$ for which the noise n and interference is a minimum. Alternative equations and algorithms such as sphere decoder, QR-Maximum Likelihood, etc. could be used. QR decomposition (or "QR factorization") is a well-known technique and can be used to transform a channel matrix into an upper triangular matrix. In particular, a QR decomposition can be applied to the channel matrix H to find a matrix R such that H=QR and R is upper triangular. In any case, a combined demodulation using channel transfer functions of both the interfering signal path and the serving signal path and in some embodiments also includes power control values as described later is used to select an interference-mitigated signal s from the set of possible signal candidates.

To perform the channel estimation for the interfering cell (i.e. the estimation of the vector g in the above equations) at the serving eNodeB at least one of a number of different interfering signal downlink control parameters may be made available to the serving eNodeB. For example, for performing maximum likelihood decoding of the PDCCH, the downlink control parameters of the interfering cell that are used comprise the interfering cell CRS port(s) (e.g. antenna ports 0, 1, 2 or 3). However, when performing the maximum likelihood cancellation of the EPDCCH channel, terminal-specific reference signals (sometimes called UE-specific reference signals or demodulation reference signals, DM-RS) rather than CRSs are used. Terminal-specific reference signals are intended to be used by terminals for channel estimation for coherent demodulation of PDSCH in case of particular transmission channels, but they are also used for demodulation of the EPDCCH physical channel. The reference signal is then only transmitted within the resource blocks specifically assigned for PDSCH/EPDCCH transmission to that terminal.

Thus there are at least two different types of transmission modes to consider: (i) transmission modes based on cell-specific reference signals (e.g. for PDCCH); and (ii) transmission modes based on UE specific reference signals (e.g. for EPDCCH). LTE release 11 allows the network to configure a terminal with a terminal-specific reference signal, that, if configured replaces the cell identity when deriving a reference-signal sequence to be used by the terminal. However, if no terminal-specific reference signal is configured then the terminal assumes that a cell-specific reference signal applies. Terminal-specific reference signals and cell-specific reference signals can both be used in embodiments for performing interfering cell channel estimation at a UE.

Similarly to the terminal-specific reference signal being configured to replace the cell-specific reference signal, a UE can be configured with a "virtual cell identity", which, if configured, replaces the physical-cell identity when deriving a terminal-specific reference signal. The physical-cell ID and the virtual-cell ID can be supplied to a UE for the purpose of interfering cell channel estimation. Other relevant parameters for allowing interfering cell channel estimation include a Precoding-Matrix Indicator (PMI) for CRS based transmission modes and a scrambling sequence index (nSCID) for terminal-specific reference signal transmission modes. The PMI provides information about the index of transmission precoding vector from the vector codebook and is present in downlink control information formats used for CRS transmission modes only. For terminal-specific reference signal transmission modes, this information is not needed because a precoder is estimated as part of channel estimation procedure used at the terminal.

In some embodiments employing interference mitigation for terminal-specific reference signal transmission modes, the downlink control parameters used by the UE to perform channel estimation for the interfering cell comprise at least one of the antenna port, the physical cell ID, the virtual cell ID and nSCID, taken jointly and severally in any and all combinations. For these transmission modes, the terminal-specific reference signals are defined according to LTE-A such that an initialization of the scrambling factor is signaled by higher layers and this is performed as follows.

Considering now the terminal-specific reference signals of EPDCCH, for any of the antenna ports p∈{107,108,109, 110}, the reference-signal sequence r(m) is defined by $$r(m) = \frac{1}{\sqrt{2}}(1-2\cdot c(2m)) + j\frac{1}{\sqrt{2}}(1-2\cdot c(2m+1)),$$

$$m = \begin{cases} 0, 1, \ldots, 12N_{RB}^{max,DL}-1 & \text{normal cyclic prefix} \\ 0, 1, \ldots, 16N_{RB}^{max,DL}-1 & \text{extended cyclic prefix} \end{cases}$$

The pseudo-random sequence c(n) is defined in section 7.2 of 3GPP TS 36.211 version 11.0.0 (September 2012). The pseudo-random sequence generator shall be initialized with $$c_{init} = (\lfloor n_s/2 \rfloor + 1)\cdot(2n_{ID,i}^{EPDCCH}+1)\cdot 2^{16} + n_{SCID}^{EPDCCH}$$

at the start of each subframe where $n_{SCID}^{EPDCCH}=2$ and $n_{ID,i}^{EPDCCH}$ is configured by higher layers.

The EPDCCH set to which the EPDCCH associated with the demodulation reference signal belongs is denoted i∈{0, 1}. These reference signals are described in 3GPP TS 36.211 section 6.10.3A.1 version 11.0.0 (September 2012).

In terms of the signaling of downlink control channel information from the interfering cell to the UE of the serving cell, estimation of the channel signal of the interfering cell is performed using at least one of the following parameters:

1. Physical or virtual Cell ID for the interfering cell, for example, physical cell ID=0 . . . 503. This is used to obtain a cell-specific reference signal unique to the interfering eNodeB.
2. Number of CRS antenna ports for the interfering cell, for example port=0, 1, 2, 4. The interfering cell channel is estimated for all antenna ports.
3. PDSCH starting symbol for the interfering cell, for example, L=0, 1, 2, 3, 4. For Multicast/Broadcast Single-Frequency Network (MBSFN) subframe, the PDSCH starting symbol can be min(2,L). Alternatively, the PDSCH starting symbol for the interfering cell can be determined by the decoding of a neighbor-cell PCFICH. The starting symbol provides an indication of where the division is between the portion of the subframe corresponding to the PDCCH region and the portion of the subframe corresponding to the PDSCH region as illustrated in FIG. 2 described above.
4. Control Format Indicator (CFI) value (from PDCCH region) for the interfering cell L=0, 1, 2, 3, 4. For a Multicast/Broadcast Single-Frequency Network subframe, it can be min(2,L). The CFI is obtained from the PCFICH and indicates the instantaneous size of the control region in terms of the number of OFDM symbols in the subframe. Thus the CFI indirectly indicates where in the subframe the data region starts. This essentially gives the same information as the PDSCH starting symbol in list item 3 above but via a different route.
5. Multicast/Broadcast Single-Frequency Network subframe configuration for interfering cell (e.g. by Radio Resource Control signaling from the eNode B or from another network controlling entity), for example, using a bitmap.
6. Interfering EPDCCH sets allocation:
    Two bits are needed to indicate N={2,4,8}.
    Use the combinatorial index r corresponding to the physical resource block index $\{k_i\}_{i=0}^{N-1}$, ($1 \le k_i \le N_{RB}^{DL}$, $k_i < k_{i+1}$) and given by equation $$r = \sum_{i=0}^{N-1} \binom{N_{RB}^{DL}-k_i}{N-i}$$

as defined in section 7.2.1 of 3GPP TS 36.213 V11.0.0 (September 2012), where $N_{RB}^{DL}$ is the number of physical resource block pairs associated with the downlink bandwidth and $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N_{RB}^{DL}}{N}-1\right\}.$$

7. A set of subframes (e.g. signaled in the form of bitmap), where the UE can assume that the control channel parameters of interfering cell are relevant and therefore may use interference mitigation (e.g. maximum likelihood receiver) for the PDCCH channel and/or the EPDCCH channel using channel estimation for the serving cell (h) and for the interfering cell (g) based on one or more received interfering cell downlink control parameters.
8. Power control settings for the serving cell PDCCH/EPDCCH and the interfering cell PDCCH/EPDCCH $P_A$ and $P_B$, where multiple $P_A$ values may be provided for serving and/or interfering PDCCH/EPDCCH.

In some embodiments interference mitigation (e.g. maximum likelihood) can be performed starting from a certain PDCCH symbol 1 (e.g. the second PDCCH symbol with index L=1).

In another embodiment, the PDSCH starting symbols or CFI values for desired signal and interfering signal can be the same to simplify the interference mitigation techniques.

The downlink control parameter(s) used according to the present technique to estimate the channel for the interfering cell and to perform decoding (e.g. maximum likelihood or an alternative) involving both the serving channel and the interfering channel can comprise one or more of the downlink control parameters or reference signals or information as listed in item numbers 1 to 8 above. In various embodiments a set of interfering cell downlink control parameters are used by the UE to estimate the channel of the interfering cell. In some embodiments rather than specifically signaling the downlink control parameters of the interfering signal to the serving cell, the downlink control information for the interfering signal (interfering cell) comprises a signal to the serving eNodeB indicating that the control parameters are the same as for the serving cell.

This set of downlink control channel parameters is used by the UE of the serving cell to facilitate interfering channel measurements.

For the maximum likelihood interference mitigation scheme according to the present technique, the resource blocks of the radio frame for which channel estimation for an interfering signal are to be performed are determined.

Power control parameters are a particular one of the eight examples of the downlink control parameters (as described above) for the interfering cell that can be provided to perform channel estimation for the interfering cell as part of maximum likelihood interference mitigation. This will now be considered in more detail.

In addition to or instead of the CRS or terminal-specific reference signal information, further information that is related to the transmit power or ratio of power between CRS and control from the serving and interfering cells may be signaled to a UE to allow more precise interference cancellation to be performed. Examples of power or power-ratio related information that can be provided to the UE of the serving cell are the quantities $\rho_A$, $\rho_B$, $P_A$, and/or $P_B$ as defined in 3GPP TS36.213 V11.0.0 (September 2012) Section 5.2 for PDSCH, and as described below, may be signaled to the UE for PDCCH processing.

These power parameters can be measured, for example in decibels [dB].

$\rho_A$ is equal to $P_A+10 \log_{10}(2)$ [dB] when the UE receives a PDCCH data transmission using precoding for transmit diversity with four cell-specific (CRS) antenna ports;

$\rho_A$ is equal to $P_A$ [dB] otherwise where $P_A$ is a parameter provided by higher layers. For example $P_A$ can take one value from the set $P_A \in \{-6, -4.77, -3, -1.77, 0, 1, 2, 3\}$ dB. In other embodiments $P_A$ can take values other than or in addition to the values in this set.

The cell-specific ratio $\rho_B/\rho_A$ is given by Table 4 below according to cell-specific parameter $P_B$ signaled by higher layers (e.g. RRC of eNodeB) and the number of configured eNodeB cell specific antenna ports. The value $P_B$ indicates the power ratio $\rho_B/\rho_A$ for the control channel on the first OFDM symbol (with CRS) to the second, third, fourth OFDM symbols of the subframe. Table 4 gives the cell-specific ratio $\rho_B/\rho_A$ for 1, 2, or 4 cell specific antenna ports.

TABLE 4

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Table 5 below gives the OFDM symbol indices within a slot of the radio frame where the ratio of the corresponding PDSCH/PDCCH Energy Per Resource Element (EPRE) to the cell-specific Reference Signal EPRE (RS EPRE) is denoted by $\rho_A$ or $\rho_B$.

| | OFDM symbol indices within a slot where the ratio of the corresponding PDSCH/PDCCH EPRE to the cell-specific RS EPRE is denoted by $\rho_A$ | | OFDM symbol indices within a slot where the ratio of the corresponding PDSCH/PDCCH EPRE to the cell-specific RS EPRE is denoted by $\rho_B$ | |
|---|---|---|---|---|
| Number of antenna ports | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

Figure 5:
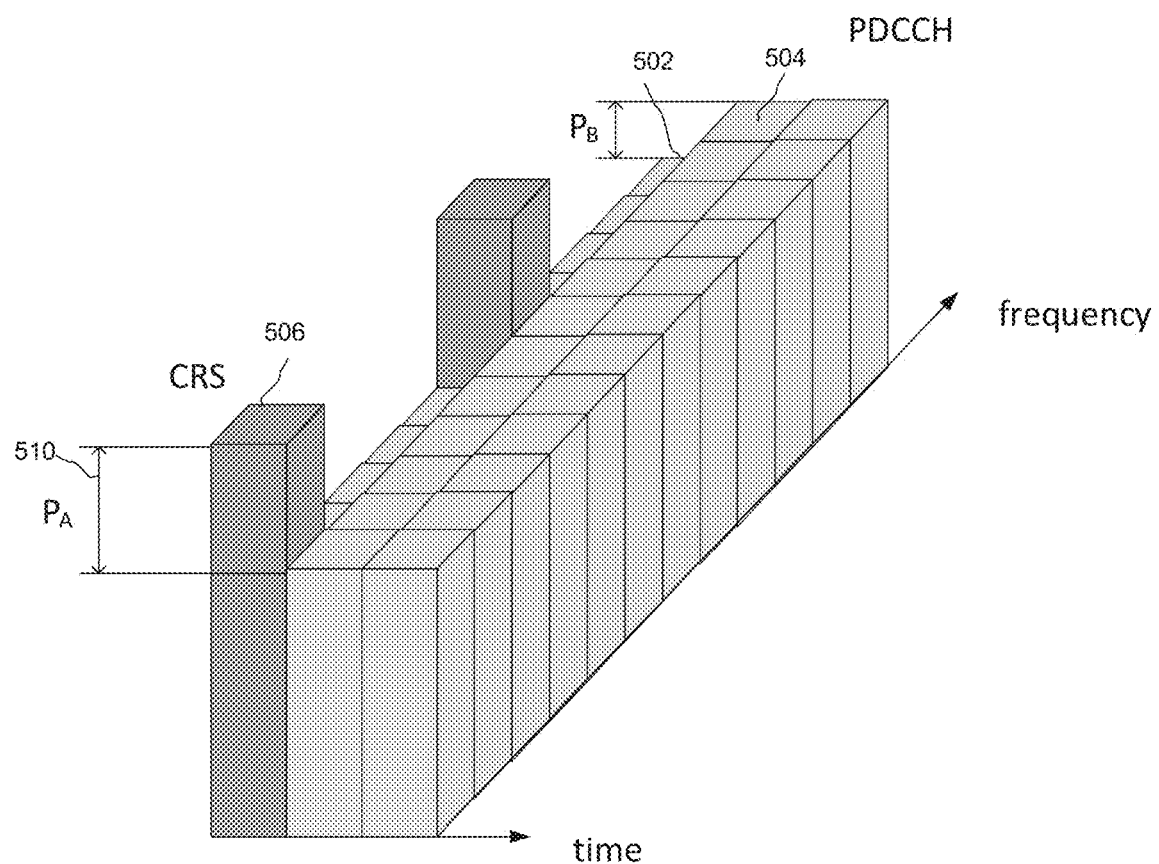
FIG. 5 schematically illustrates power control on the PDCCH for serving and interfering cells.

FIG. 5 schematically illustrates power control on the PDCCH for serving and interfering cells. It shows one example of a power profile of PDCCH and of the CRS as a function of time and frequency and the first three OFDM symbols (corresponding to the PDCCH region of FIG. 3A) have been shown. The magnitude of the power applied to each timeslot and subcarrier is shown in the vertical dimension and it can be seen that different power allocations can and have been allocated to different subcarriers. It can be seen from this Figure that the power parameter $P_A$ corresponds to the difference between the CRS power allocation and the PDCCH allocation for a given subcarrier whilst the power parameter $P_B$ corresponds to a difference in PDCCH power levels between the first OFDM symbol and the second and third OFDM symbols of the PDCCH. In this example, the second and third OFDM symbols of the PDCCH both have the same power magnitude, but the first OFDM symbol has a different, lower power level.

The power control parameters $\rho_A$, $\rho_B$, $P_A$, $P_B$ may be the same or different for PDCCH and PDSCH, also $\rho_A$, $\rho_B$, $P_A$, $P_B$ may be the same or different for serving and interfering PDCCH.

In some embodiments to account for possible UE-specific power control that can be applied on interfering cell, a set of $P_A$ values for PDCCH of serving and interfering cells can be signaled to the mobile terminal. In this case the set of constellation points T of Table 3 for maximum likelihood interference cancellation should be extended to account for possible power control values $P_A$ which can be applied on serving and interfering cell PDCCH. An example of this is shown in FIG. 6.

Figure 6:
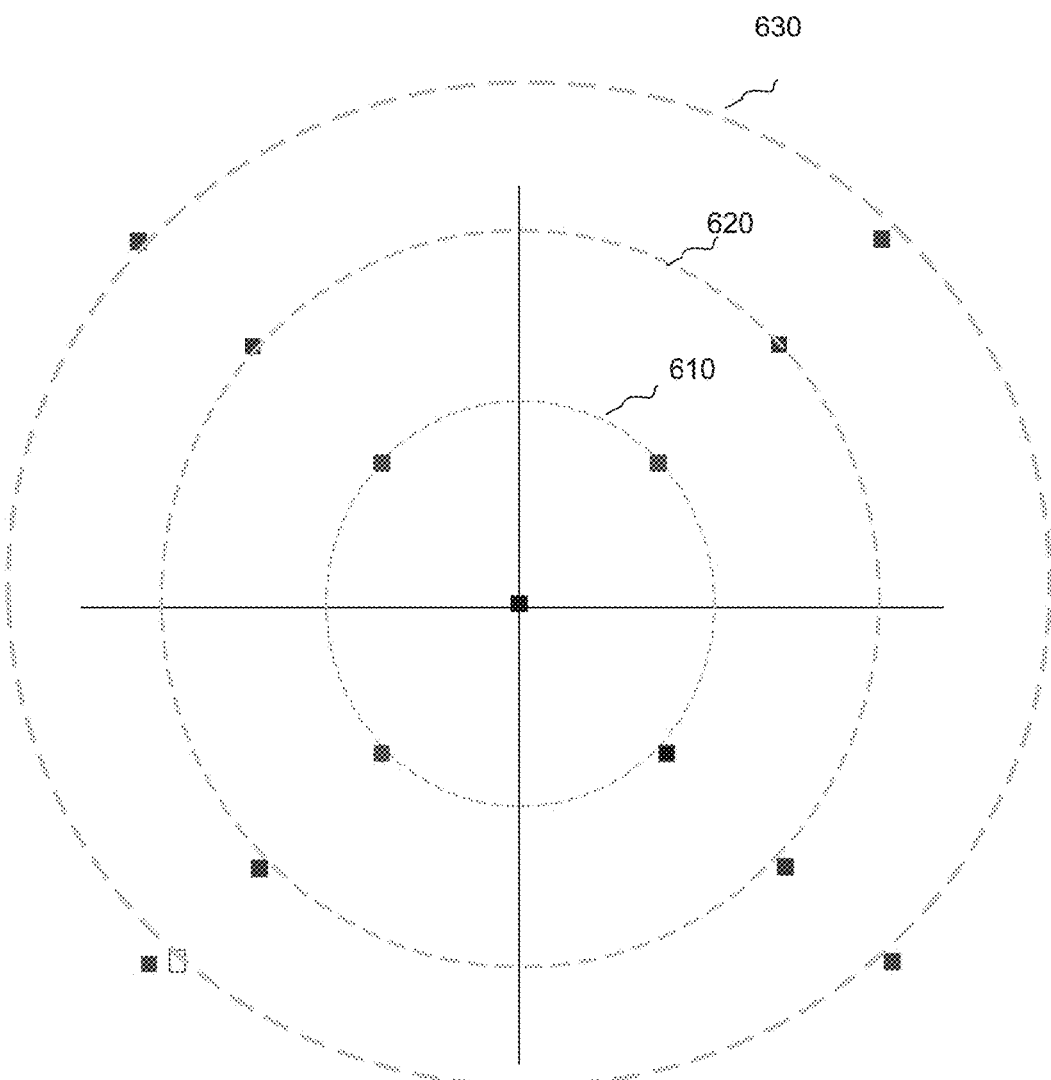
FIG. 6 schematically illustrates a QPSK modulation constellation with the effects of power control on the set of points, T, for use in the maximum likelihood calculation shown.

FIG. 6 schematically illustrates a QPSK modulation constellation similar to that of FIG. 4, but where the effects of power control on the set of points T for use in the maximum likelihood calculation has been shown. The innermost set of four constellation points 610, which lie on the circumference of the circle correspond to the QPSK modulation scheme where no power control has been applied to the channel. The next set of four constellation points 620 lying on a larger radius have a higher amplitude due to power boosting and the outermost set of four points 630 have yet a higher amplitude due to further power boosting. The middle set of points correspond, for example to the first OFDM symbol of the PDCCH in FIG. 5, which has a first level of power boosting, whilst the outermost set of four constellation points corresponds to the second and third OFDM symbols of the PDCCH, which have a higher level of power boosting.

Figure 7:
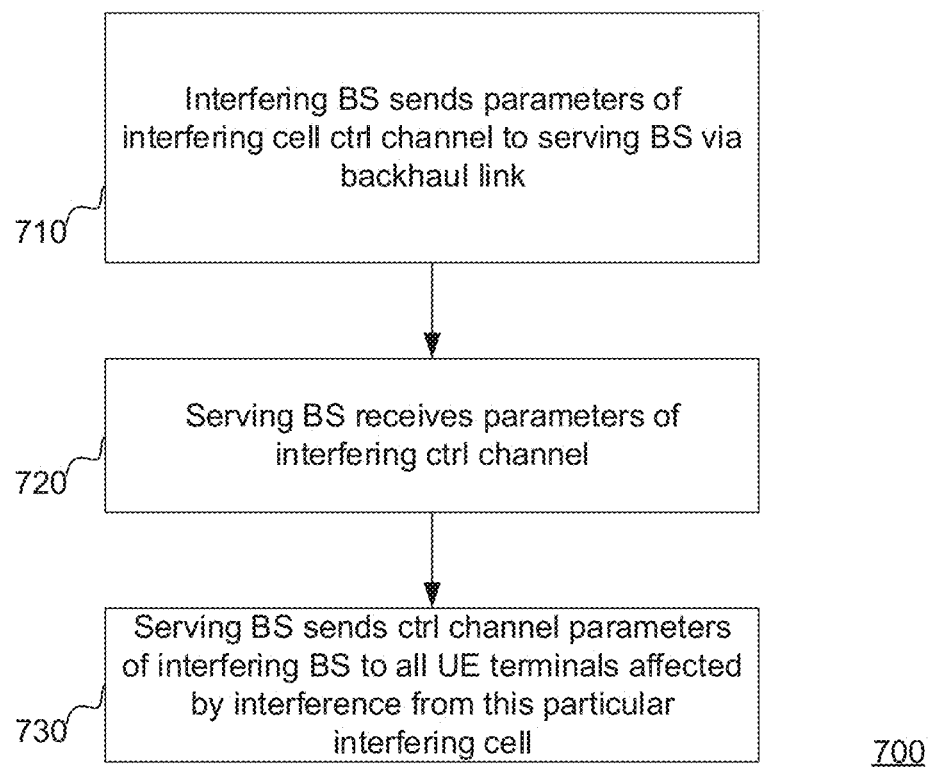
FIG. 7 schematically illustrates is a flow chart that schematically illustrates a signaling procedure at the eNodeB.

In other embodiments, instead of sending $P_A$ values for serving and interfering cells to the UE of the serving cell, the absolute transmit power for each channel is signaled to the UE. FIG. 7 is a flow chart that schematically illustrates a signaling procedure at the eNodeB for implementing the present technique. At process element 710 an interfering eNodeB sends one or more parameters characteristic of its downlink control channel to the serving eNodeB of the UE that is to perform interference mitigation (e.g. by using maximum likelihood receiver described above). This information is sent by higher layer signaling (i.e. higher than the physical layer) via a "backhaul link" between the serving eNodeB and the interfering eNodeB. The backhaul link in this embodiment is a wired link using an X2 application protocol (X2AP), but in other embodiments could be, for example, an optical link or wireless link implementing an alternative protocol. At process element 720, the serving eNodeB receives the parameters of the control channel for the interfering eNodeB and recognizes that the information is destined for a particular UE or set of UEs served by the receiving eNodeB. Next, at process element 730, the serving eNodeB sends the control parameters of the interfering eNodeB using higher layer signaling (e.g. using RRC) to the served UEs known by the serving eNodeB to be subject to interference from the given interfering channel signal. The UEs of the serving cell that receive this control information perform processing as shown in the flow chart of FIG. 8.

Figure 8:
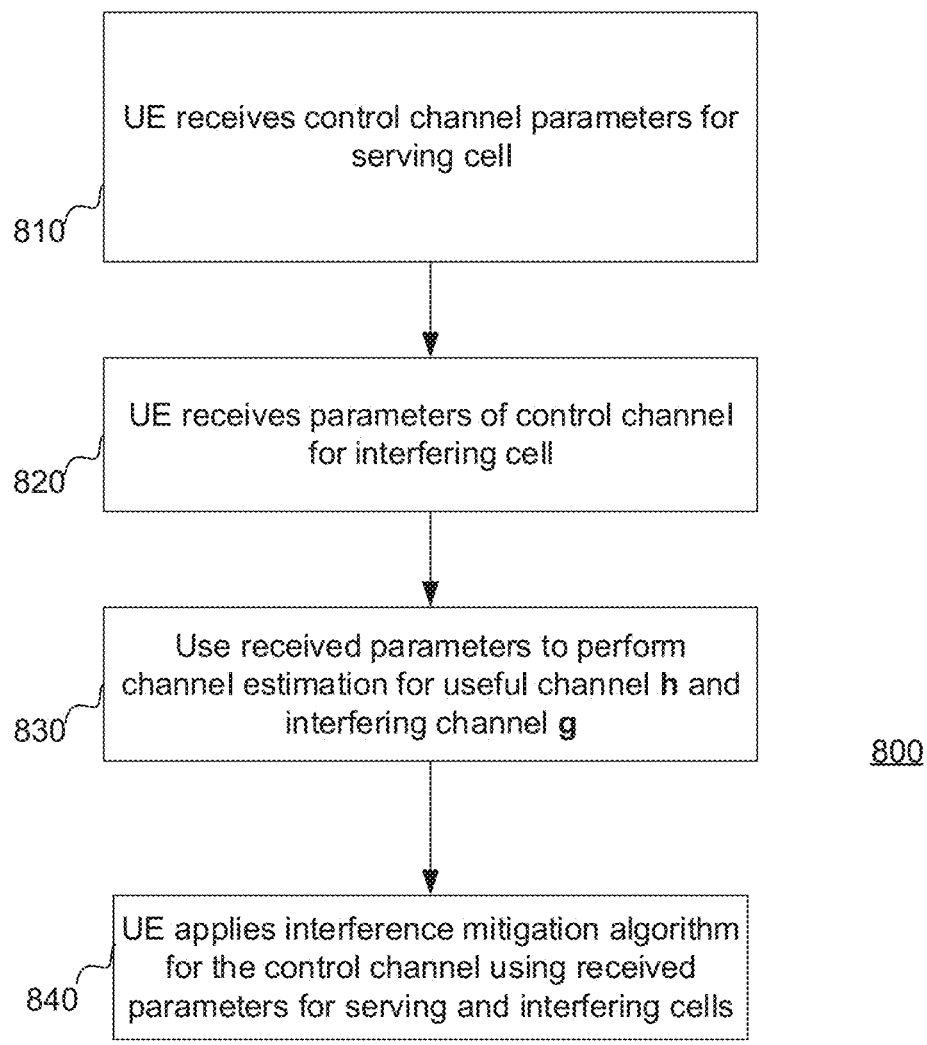
FIG. 8 is a flow chart schematically illustrating signaling procedures at a UE configured to perform interference mitigation.

FIG. 8 schematically illustrates a flow chart of signaling procedures at a UE configured to perform interference mitigation (e.g. maximum likelihood) according to the present technique. The process begins at process element 810 where the UE of the serving cell receives control channel parameters for the serving cell in a conventional manner. At process element 820, the UE receives one or more downlink control parameters of a control channel for the interfering cell. Optionally the UE may also receive an additional one or more downlink control parameters of a control channel for the serving cell (e.g. power control related parameters). In this example, the parameters received are a CRS signal for the interfering cell and power control parameters. At process element 830, the UE uses the received information to perform channel estimation for the useful channel h and for the interfering channel g and using the estimated channels and knowledge of the modulation scheme applied to the PDCCH/PCFICH/PHICH performs a calculation of the optimal useful signal candidate according to equation 2. At process element 840, the estimated channels, the signal candidates of equation 2 and the modulation signal points are used to perform the maximum likelihood calculation specified by equation 3 for a given resource element and a given channel signal (e.g. PDCCH, EPDCCH, PCFICH, PHICH etc.) to estimate the optimal useful signal. In some example embodiments the maximum likelihood interference mitigation can be performed starting from a certain PDCCH symbol, for example, the second PDCCH symbol with index not equal to one. In other example embodiments the downlink shared channel (PDSCH) starting symbols or control format indicator (CFI) values for the desired (i.e. useful or required) signal and the interfering signal can be arranged to be the same values to simplify the interference mitigation techniques.

Figure 9:
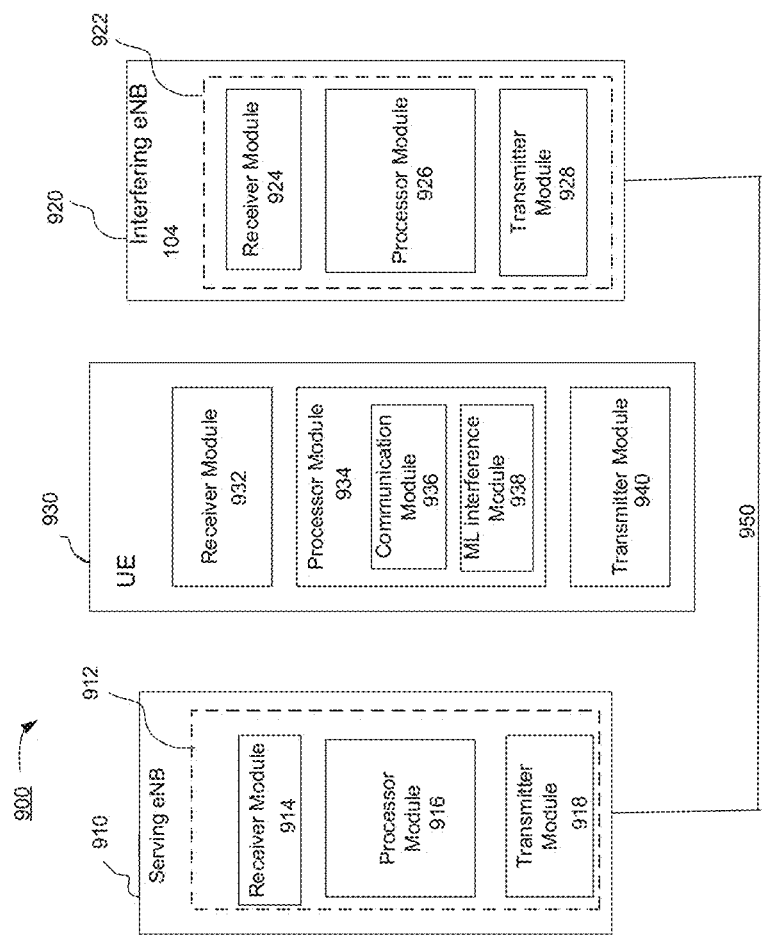
FIG. 9 schematically illustrates a wireless communication system comprising a serving node, an interfering node and a wireless device.

FIG. 9 schematically illustrates a wireless communication system 900 comprising a serving node 910, an interfering node 920 and an example wireless device 930 configured to perform wireless communication with other UEs (not shown) via the serving node 910. The serving and interfering nodes can each include a node device 912 and 922. The node device or the node can be configured to communicate with the wireless device (UE) 930. The node devices 912, 922 can be configured to communicate on a plurality of different communication channels (e.g. PDCCH, EPDCCH, PCFICH, and PDSCH) configured for a plurality of resource elements in a physical resource block (PRB).

The node devices 912, 922 or the nodes 910, 920 can be configured to communicate with other nodes via a backhaul link 950 (optical or wired link), such as an X2 application protocol (X2AP). The serving 912 and interfering 922 node devices can include a processor module 916, 926, a receiver module 914 and 924 and a transmitter module 918, 928. The transmitter module 918 of the serving node 910 can be configured to communicate with the wireless device 930 to send downlink control channel information associated with downlink data communicated to the wireless device 930. The downlink data and associated control information are communicated together in radio frames according to a wireless communication protocol.

The interfering node 920 is configured by a network controlling entity to use the transmitter module 928 to communicate to the serving node 910 via the backhaul link 950, one or more downlink control parameters characteristic of an interfering channel likely to interfere with a communication path between the serving node 910 and the served wireless device 930. The UE 130 can be configured to obtain parameters of the interfering-cell and serving-cell downlink control information by higher layer signaling comprising at least one of radio resource control (RRC) signaling and system information block (SIB) signaling.

The wireless device 930 comprises a receiver module 932 and a transmitter module 940 for communicating with other wireless devices and eNodeBs. The wireless device also comprises a processor module 934 having a communication module 936 and a maximum likelihood interference module 938. The communication module 936 may be used to transmit information on an uplink channel via the transmitter module 940 and to receive information received on a downlink channel via the receiver module 932. The wireless device 930 is provided with a maximum likelihood interference module for performing combined demodulation of a useful channel and of an interfering channel using, for example, a maximum likelihood technique to mitigate intercell interference and described, for example, by equations 2 and 3 above.

The node (e.g., serving node 910 and interfering node 920) can include a base station (BS), a Node B (NB), an evolved Node B (eNB), a baseband unit (BBU), a remote radio head (RRH), a remote radio equipment (RRE), a remote radio unit (RRU) or a central processing module. The serving node 910, the interfering node 920 and the wireless device 930 can be configured to implement maximum likelihood interference cancellation at the wireless device 930 according to the present technique.

Figure 10:
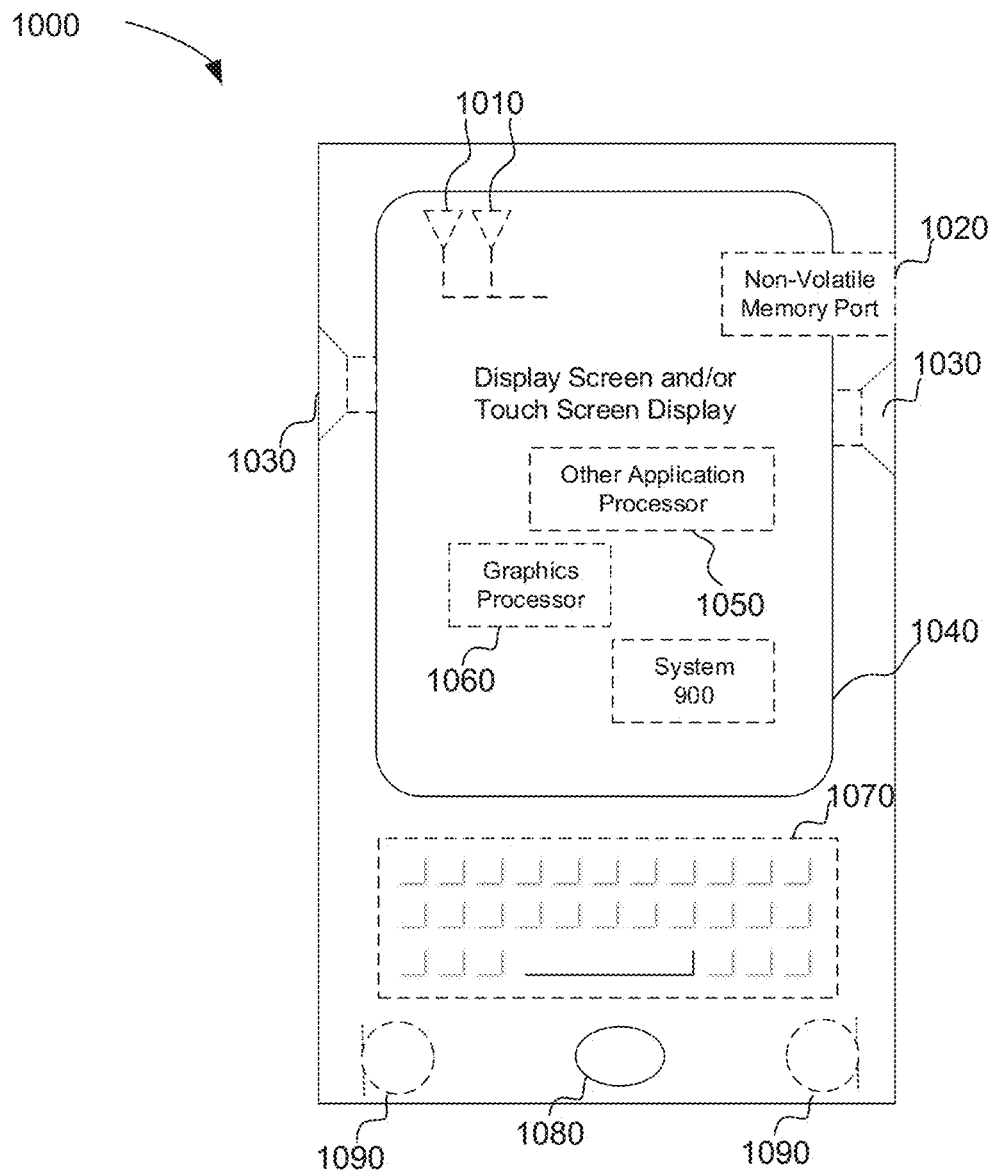
FIG. 10 schematically illustrates a wireless device.

FIG. 10 provides an example illustration of a wireless device 1000, such as user equipment (UE), a mobile station (MS), a mobile wireless device, a mobile communication device, a tablet, a handset, or other type of wireless device. The wireless device can include one or more antennas 1010 configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 1000 of FIG. 10 also provides an illustration of a microphone 1090 and one or more speakers 1030 that can be used for audio input and output from the wireless device. The device comprises multiple antennas 1010. The display screen 1040 may be a liquid crystal display (LCD) screen, or other type of display screen such as an organic light emitting diode (OLED) display. The display screen 1040 can be configured as a touch screen. The touch screen may use capacitive, resistive, or another type of touch screen technology. An application processor 1050 and a graphics processor 1060 can be coupled to internal memory to provide processing and display capabilities. A non-volatile memory port 1020 can also be used to provide data input/output options to a user. The non-volatile memory port 1020 may also be used to expand the memory capabilities of the wireless device. A keyboard 1070 may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that where the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

Embodiments provide interference mitigation at the UE (receiver side) and one effect of this is gains in spectral efficiency achieved by taking account of spatial properties of the interference. Previously known techniques attempted to improve channel reliability at the transmitter/network side rather than the receiver side using techniques such as channel coding and spatial/frequency diversity and coordinated multipoint. Although maximum likelihood decoding has previously been implemented for single user MIMO to mitigate intra-cell interference on data channels, this involved joint demodulation of two data streams being received by the same UE substantially simultaneously. According to the present technique, inter-cell interference of one or more communication channel is mitigated at the receiver side by joint demodulation (using for example maximum likelihood demodulation), of a serving cell channel and an interfering cell channel. This is facilitated by providing the serving eNodeB with downlink control information or reference information characteristic of the interfering cell such as, for example, cell-specific reference signals, power control parameters, terminal-specific reference signals and modulation format information or at least an indication that the interfering cell downlink control parameters or reference information matches the serving cell control parameters.

Some embodiments implement the interference mitigation on one or more downlink control channels at the UE. This improves the robustness of communications on, for example, the PDCCH and the EPDCCH by mitigating interference at the receiver side in addition to providing robustness at the network side via channel coding and spatial/frequency diversity.

A New Carrier Type (NCT) (or carrier with reduced CRS density) may be introduced in the future 3GPP LTE release as a non-backward compatible carrier capable of increasing throughput. The density of CRS may be reduced both in frequency domain and time domain upon implementation of the NCT. With the reduced CRS density, the legacy control channels, such as PBCH, PHICH, PCFICH, PDCCH that rely on CRS for demodulation may have to be modified/enhanced for NCT, especially in embodiments where the NCT is used as a standalone carrier (compared to non-standalone carrier). In LTE Release 11, EPDCCH was demodulated based on a UE-specific reference signal as an enhanced version of legacy PDCCH for UE search space (USS).

According to some embodiments UE-specific reference signals can be extended such that PHICH, PBCH, PCFICH and common search space (CSS) in PDCCH for NCT also use UE-specific demodulation (e.g. DM-RS). The proposed interference mitigation scheme can also be applied to the NCT to improve the performance of both data and control channel in NCT (e.g. PDSCH, EPDCCH, ePBCH, ePCFICH, ePHICH, etc.).

EXAMPLES

The following examples pertain to further embodiments.

Example 1 is interference mitigation circuitry for a UE for use in a wireless communication network, the circuitry comprising: an input module configured to receive from transceiver circuitry in the UE a downlink channel signal from a serving cell and for receiving downlink control information for an interfering cell; a channel estimation module configured to estimate a channel transfer function for the channel signal in the serving cell using received serving-cell downlink control parameters and to estimate a channel transfer function for the interfering signal using the received interfering-cell downlink control information; an interference mitigation module configured to calculate an interference-mitigated channel signal for the received downlink channel signal by performing demodulation of the received downlink channel signal using the estimated serving-cell channel transfer function, the estimated interfering-cell channel transfer function, and a set of modulation constellation points corresponding to the downlink channel signal.

Example 2 may be the subject matter of Example 1 where the interference mitigation module is optionally configured to perform the demodulation by implementing a maximum likelihood estimation computation.

Example 3 may be the subject matter of Example 1 or Example 2 in which the interference mitigation module is optionally configured to estimate the channel transfer function of the interfering cell using downlink control information comprising one of a cell-specific reference signal and a UE-specific reference signal for the interfering signal.

Example 4 may be the subject matter of any one or more of Examples 1 to 3, in which the received downlink channel signal is optionally an Orthogonal Frequency Division Multiplexing (OFDM) signal.

Example 5 may be the subject matter of any one or more of Examples 1 to 4, wherein the downlink channel signal for which the interference mitigation module is optionally configured to calculate an interference-mitigated channel signal corresponds to a downlink control channel.

Example 6 may be the subject matter of any one or more of Examples 1 to 5 wherein the interference mitigation module is optionally configured to calculate an interference-mitigated channel signal for at least one of: PDCCH, PCFICH, PHICH, PDSCH, EPDCCH, ePCFICH and ePBCH, taken jointly and severally in any and all combinations.

Example 7 may be the subject matter of any one or more of Examples 1 to 6, wherein optionally the interference mitigation module is configured to use for calculation of the interference-mitigated channel signal, downlink control information from the interfering cell comprising at least one of: a cell identifier; a number of cell-specific reference signal antenna ports of the corresponding transmitter; a PDSCH starting symbol; a Control Format Indicator value; an MBSFN subframe configuration for the interfering cell; and an interfering cell EPDCCH sets allocation, taken jointly and severally in any and all combinations.

Example 8 may be the subject matter of any one or more of Examples 1 to 7, wherein the downlink control information optionally comprises power control information for at least one of the serving cell and the interfering cell and the power control information is used by at least one of the channel estimation module and the interference mitigation module.

Example 9 may be the subject matter of any one or more of Examples 1 to 8, wherein the power control information optionally comprises at least one of: an absolute transmit power of a control channel signal of the interfering cell; a power ratio between a control channel signal of the interfering cell and one of the cell-specific reference signal and the terminal-specific reference signal; and a power ratio between a control channel signals on OFDM symbols with and without cell-specific reference signals, taken jointly and severally in any and all combinations.

Example 10 may be the subject matter of any one or more of Examples 1 to 9, wherein the interference mitigation module is optionally configured to estimate the channel functions by calculating a useful signal candidate $\hat{s}(t_i)$ defined as $\hat{S}(t_i)=\text{slice}\{(h^h h)^{-1} h^h (r - g \cdot t_i)\}$, where h is the channel transfer function for the serving channel, g is the channel transfer function for the interfering channel, r is the received signal, $t_i$ is an element of the set T of all possible interfering signal candidates and the superscript h represents a Hermitian transpose.

Example 11 may be the subject matter of claim 10, wherein optionally, a useful signal, s, is calculated by the interference mitigation module from the useful signal candidate $\hat{s}(t_i)$ according to the definition:

$$s = \underset{t_i \in T}{\text{argmin}} \| r - g \cdot t_i - h\hat{s}(t_i) \|^2.$$

Example 12 may be the subject matter of any one or more of Examples 1 to 11, wherein the maximum likelihood interference module is optionally configured to use downlink control information comprising subframe selection information identifying at least a subset of subframes for which the UE is permitted to perform calculation of the interference-mitigated channel signal using the downlink control information for the interfering cell.

Example 13 is a User Equipment (UE) comprising the interference mitigation circuitry of any one or more of Examples 1 to 12 and a transceiver for receiving a downlink channel signal for the serving cell and for receiving, from the wireless network, downlink control information for an interfering cell, the downlink control information for use by the UE in performing channel estimation for an interfering signal of the interfering cell.

Example 14 may be the subject matter of claim 13, optionally configured to obtain parameters of the interfering-cell and serving-cell downlink control information by higher layer signaling comprising at least one of radio resource control (RRC) signaling and system information block (SIB) signaling.

Example 15 is a method for mitigating interference in a UE operable in a wireless network, the method comprising: receiving at a UE in a serving cell an OFDM channel signal for a downlink radio channel; receiving from the wireless network reference information for an interfering cell, reference information for use by the UE in performing channel estimation for an interfering signal of the interfering cell; estimating a channel transfer function for the useful signal using control parameters of the serving cell; estimating a channel transfer function for the interfering signal using the received reference information; calculating a most-likely useful signal by performing a combined demodulation of the received OFDM channel signal using the estimated channel transfer functions for the serving cell and for the interfering cell and a set of possible interfering signal points corresponding to the OFDM channel.

Example 16 may be the subject matter of example 15, wherein optionally the reference information used for estimating the channel transfer function for interfering signal comprises one of a cell-specific reference signal and a terminal-specific reference signal associated with the interfering signal.

Example 17 may be the subject matter of Example 15 or Example 16, wherein optionally the OFDM channel signal for which the most-likely useful signal is calculated by the UE is a downlink control channel.

Example 18 may be the subject matter of any one or more of Examples 15 to 18, wherein optionally the OFDM channel signal is one of: PDCCH, PCFICH, PHICH, PDSCH, EPDCCH, ePCFICH and ePBCH.

Example 19 may be the subject matter of any one or more of Examples 15 to 18, wherein optionally the reference information comprises at least one of: a cell identifier; a number of cell-specific reference signal antenna ports of the corresponding transmitter; a PDSCH starting symbol; a Control Format Indicator value; an MBSFN subframe configuration for the interfering cell; and an interfering cell EPDCCH sets allocation, taken jointly severally or in any combination.

Example 20 may be the subject matter of any one or more of Examples 15 to 19, wherein optionally the reference information comprises power control information for at least one of the serving cell and the interfering cell and the power control information is used for at least one of the channel transfer function estimation and the demodulation of the OFDM channel signal.

Example 21 is a computer program product embodied on a non-transitory computer-readable medium comprising program instructions configured such that when executed by processing circuitry cause the processing circuitry to implement the method of any one of Examples 15 to 19.

Example 22 is a serving-cell eNodeB for communicating to a UE located in a serving cell in a wireless network, the serving-cell node comprising: transceiver circuitry for sending to a User Equipment located in the serving cell, an OFDM radio frame comprising a downlink channel signal; an eNodeB interface for acquiring from an interfering eNodeB, interfering-cell downlink control information for an interfering cell and for sending the acquired interfering-cell downlink control information to the serving-cell User Equipment via the transceiver circuitry; wherein the interfering-cell downlink control information is used by the serving-cell UE to estimate a channel transfer function for an interfering signal of the interfering cell and to select a signal candidate representing an interference-controlled value of the received downlink channel signal by performing demodulation of the received downlink channel signal using the estimated channel transfer function for the interfering signal and the interfering-cell downlink control information.

Example 23 may be the subject matter of Example 22, wherein optionally the eNodeB interface is configurable to connect the interfering-cell eNodeB to a serving-cell eNodeB via a backhaul link using an X2 interface.

Example 24 is a method for communicating information between a serving eNodeB, serving a UE in a serving cell, and an interfering eNodeB in a wireless network, the method comprising:

sending from the serving eNodeB to the UE, a radio frame comprising an OFDM downlink channel signal and downlink control parameters for the serving cell; acquiring at the serving eNodeB, from the interfering eNodeB via an interface, at least one interfering-signal downlink control specifier corresponding to an interfering cell and sending the acquired interfering-signal downlink control specifier to the UE; wherein the serving-cell downlink control parameters and the interfering-signal downlink control specifier provided by the serving base station are used by the UE to estimate channel transfer functions for the serving cell and the interfering cell and to calculate an interference-compensated OFDM downlink channel signal by performing demodulation of the received OFDM downlink channel signal using the estimated channel transfer functions for both the serving cell and the interfering cell and using information derived from the interfering-signal downlink specifier.

Example 25 may be the subject matter of Example 24 optionally comprising sending from the serving eNodeB to the UE at least one downlink control parameter of a control channel for the serving cell.

Example 26 is an interference mitigation device for a UE for use in a wireless communication network, the device comprising: means for receiving from transceiver circuitry in the UE a downlink channel signal from a serving cell and for receiving downlink control information for an interfering cell; means for estimating a channel transfer function for the channel signal in the serving cell using received serving-cell downlink control parameters and for estimating a channel transfer function for the interfering signal using the received interfering-cell downlink control information; means for calculating an interference-mitigated channel signal for the received downlink channel signal by performing demodulation of the received downlink channel signal using the estimated serving-cell channel transfer function, the estimated interfering-cell channel transfer function, and a set of modulation constellation points corresponding to the downlink channel signal.

Example 27 is a serving-cell eNodeB for communicating to a UE located in a serving cell in a wireless network, the serving-cell node comprising: means for sending to a User Equipment located in the serving cell, an OFDM radio frame comprising a downlink channel signal; means for acquiring from an interfering eNodeB, interfering-cell downlink control information for an interfering cell and for sending the acquired interfering-cell downlink control information to the serving-cell User Equipment via the means for sending; wherein the interfering-cell downlink control information is used by the serving-cell UE to estimate a channel transfer function for an interfering signal of the interfering cell and to select a signal candidate representing an interference-controlled value of the received downlink channel signal by performing demodulation of the received downlink channel signal using the estimated channel transfer function for the interfering signal and the interfering-cell downlink control information.

Example 28 is a computer readable medium comprising instructions, which, when executed, cause a processor to carry out the method of any one or more of Examples 15 to 19, and examples 24 and 25.

Example 29 is a UE for use in a wireless communication network, the device comprising: transceiver circuitry; a touchscreen configured to receive input from a user for processing by the UE; input circuitry configured to receive from the transceiver circuitry a downlink channel signal from a serving cell and for receiving downlink control information for an interfering cell; channel estimation circuitry configured to estimate a channel transfer function for the channel signal in the serving cell using received serving-cell downlink control parameters and to estimate a channel transfer function for the interfering signal using the received interfering-cell downlink control information; interference mitigation circuitry configured to calculate an interference-mitigated channel signal for the received downlink channel signal by performing demodulation of the received downlink channel signal using the estimated serving-cell channel transfer function, the estimated interfering-cell channel transfer function, and a set of modulation constellation points corresponding to the downlink channel signal.

The invention claimed is:

1. A user equipment UE to be used in a wireless communication network, the UE comprising:
receiver circuitry to receive a downlink channel signal from a serving cell and to receive downlink control information for an interfering cell; and
processing circuitry to:
estimate a channel transfer function for the downlink channel signal in the serving cell using received serving-cell downlink control parameters;
estimate a channel transfer function for an interfering signal using the received interfering-cell downlink control information; and
calculate an interference-mitigated channel signal for the received downlink channel signal by performing demodulation of the received downlink channel signal using the estimated serving-cell channel transfer function, the estimated interfering-cell channel transfer function, and a set of modulation constellation points corresponding to the downlink channel signal.

2. The UE of claim 1, wherein the processing circuitry is further to perform the demodulation by implementing a maximum likelihood estimation computation.

3. The UE of claim 2, wherein the processing circuitry is to estimate the channel transfer function of the interfering cell using downlink control information comprising a cell-specific reference signal or a UE-specific reference signal for the interfering signal.

4. The UE of claim 3, wherein the downlink control information comprises power control information for the serving cell or the interfering cell.

5. The UE of claim 4, wherein the power control information comprises: an absolute transmit power of a control channel signal of the interfering cell; a power ratio between a control channel signal of the interfering cell and the cell-specific reference signal or the UE-specific reference signal; or a power ratio between control channel signals on OFDM symbols with and without cell-specific reference signals.

6. The UE of claim 1, wherein the downlink channel signal for which the processing circuitry is to calculate the interference-mitigated channel signal corresponds to a downlink control channel.

7. The UE of claim 1, wherein the processing circuitry is to calculate the interference-mitigated channel signal based on downlink control information from the interfering cell comprising: a cell identifier; a number of cell-specific reference signal antenna ports of a corresponding transmitter; a PDSCH starting symbol; a Control Format Indicator value; an MBSFN subframe configuration for the interfering cell; or an interfering-cell EPDCCH sets allocation.

8. The UE of claim 1, wherein the processing circuitry is to estimate the channel transfer functions by calculating a signal candidate $\hat{s}(t_i)$ defined as $\hat{s}(t_i)$=slice $\{(h^h h)^{-1} h^h (r - g \cdot t_i)\}$, where h is the channel transfer function for a serving channel, g is the channel transfer function for an interfering channel, r is the received signal, $t_i$ is an element of a set T of all possible interfering signal candidates and the superscript h represents a Hermitian transpose.

9. The UE of claim 8, wherein a signal, s, is calculated by the processing circuitry from the signal candidate $\hat{s}(t_i)$ according to a definition:

$$s = \underset{t_i \in T}{\mathrm{argmin}} \| r - g \cdot t_i - h\hat{s}(t_i) \|^2.$$

10. The UE of claim 1, wherein the processing circuitry is to use downlink control information comprising subframe selection information identifying at least a subset of subframes for which the UE is permitted to perform calculation of the interference-mitigated channel signal using the downlink control information for the interfering cell.

11. The UE of claim 1 wherein the UE is to use the downlink control information in performing channel estimation for an interfering signal of the interfering cell.

12. The UE of claim 11, wherein the processing circuitry is to obtain parameters of the interfering-cell and serving-cell downlink control information by higher layer signaling comprising radio resource control (RRC) signaling or system information block (SIB) signaling.

13. The UE of claim 11, further comprising a touchscreen to receive input from a user for processing by the UE.

14. A method to mitigate interference in a UE operating in a wireless network, the method comprising:
   receiving at a UE in a serving cell an OFDM channel signal for a downlink radio channel;
   receiving from the wireless network reference information for an interfering cell, the reference information for use by the UE in performing channel estimation for an interfering signal of the interfering cell;
   estimating a channel transfer function for a signal using control parameters of the serving cell;
   estimating a channel transfer function for the interfering signal using the received reference information;
   calculating an interference-mitigated signal by performing a combined demodulation of the received OFDM channel signal using the estimated channel transfer functions for the serving cell and for the interfering cell and a set of possible interfering signal points corresponding to the OFDM channel.

15. The method of claim 14, wherein the reference information used for estimating the channel transfer function for the interfering signal comprises a cell-specific reference signal or a terminal-specific reference signal associated with the interfering signal.

16. The method of claim 14, wherein the OFDM channel signal for which the interference mitigated interference-mitigated signal is calculated by the UE is a downlink control channel.

17. The method of claim 14, wherein the reference information comprises: a cell identifier; a number of cell-specific reference signal antenna ports of a corresponding transmitter; a PDSCH starting symbol; a Control Format Indicator value; an MBSFN subframe configuration for the interfering-cell; or an interfering-cell EPDCCH sets allocation.

18. The method of claim 14, wherein the reference information comprises power control information for the serving cell or the interfering cell and the power control information is used for the channel transfer function estimation or the demodulation of the OFDM channel signal.

19. A computer program product embodied on a non-transitory computer-readable medium comprising program instructions configured such that when executed by processing circuitry cause the processing circuitry to:
   receive from transceiver circuitry a downlink channel signal from a serving cell and for receiving downlink control information for an interfering cell;
   estimate a channel transfer function for the channel signal in the serving cell using received serving-cell downlink control parameters;
   estimate a channel transfer function for an interfering signal using the received interfering-cell downlink control information; and
   calculate an interference-mitigated channel signal for the received downlink channel signal by performing demodulation of the received downlink channel signal using the estimated serving-cell channel transfer function, the estimated interfering-cell channel transfer function, and a set of modulation constellation points corresponding to the downlink channel signal.

20. The computer program product of claim 19, wherein the channel transfer function of the interfering cell is estimated using downlink control information comprising a cell-specific reference signal or a UE-specific reference signal for the interfering signal.

21. A serving-cell node to communicate to a UE located in a serving cell of the serving-cell node in a wireless network, the serving-cell node comprising:
   transceiver circuitry to send to the UE located in the serving cell, serving cell downlink control parameters and an OFDM radio frame comprising a downlink channel signal;
   an eNodeB interface to acquire from an interfering eNodeB, interfering-cell downlink control information for an interfering cell of the interfering eNodeB and to send the acquired interfering-cell downlink control information to the UE via the transceiver circuitry;
   wherein the received serving-cell downlink control parameters are to be used by the UE to estimate a channel transfer function for the serving cell, wherein the interfering-cell downlink control information is to be used by the UE to estimate a channel transfer function for an interfering signal of the interfering cell and to select a signal candidate representing an interference-controlled value of the received downlink channel signal by performing demodulation of the received downlink channel signal using the estimated channel transfer function for the interfering signal, the estimated channel transfer function for the serving cell, and a set of modulation constellation points corresponding to the downlink channel signal.

22. The serving-cell node as claimed in claim 21, wherein the eNodeB interface is to connect the interfering eNodeB to the serving-cell node via a backhaul link using an X2 interface.

* * * * *

UNITED STATES PATENT AND TRADEMARK OFFICE
CERTIFICATE OF CORRECTION

PATENT NO.       : 9,723,508 B2
APPLICATION NO.  : 14/646524
DATED            : August 1, 2017
INVENTOR(S)      : Alexei Davydov et al.

It is certified that error appears in the above-identified patent and that said Letters Patent is hereby corrected as shown below:

Column 22
Line 56, In Claim 8 "…$t_i$is…" should read --…$t_i$ is…--

Column 23
Line 38-39, In Claim 16 "…interference mitigated interference-mitigated signal…" should read --…interference-mitigated signal…--

Signed and Sealed this
First Day of May, 2018

Andrei Iancu
*Director of the United States Patent and Trademark Office*